United States Patent [19]
Garver

[11] 3,923,572
[45] Dec. 2, 1975

[54] METHOD AND APPARATUS FOR BUILDING TIRES

[75] Inventor: Richard F. Garver, Akron, Ohio

[73] Assignee: The B. F. Goodrich Company, Akron, Ohio

[22] Filed: Dec. 16, 1974

[21] Appl. No.: 532,883

Related U.S. Application Data

[63] Continuation of Ser. No. 338,767, March 7, 1973, abandoned.

[52] U.S. Cl.................................. 156/128; 156/416
[51] Int. Cl.². ................. B29H 17/16; B29H 17/26
[58] Field of Search .......... 156/414, 415, 417, 398, 156/419, 400, 128 R, 128 T, 130, 135

[56] References Cited
UNITED STATES PATENTS

| 2,422,652 | 6/1947 | Bacon, Jr............................ | 156/130 |
| 3,127,294 | 3/1964 | Porter............................ | 156/416 X |
| 3,265,549 | 8/1966 | Woodhall et al. .............. | 156/416 X |
| 3,402,090 | 9/1968 | Henley................................ | 156/398 |
| 3,433,695 | 3/1969 | Caretla et al. .................. | 156/416 X |
| 3,518,149 | 6/1970 | Mirtain .............................. | 156/416 |
| 3,740,292 | 6/1973 | Leblond.............................. | 156/416 |

*Primary Examiner*—Clifton B. Cosby
*Attorney, Agent, or Firm*—Joseph Januszkiewicz; W. A. Shira, Jr.

[57] ABSTRACT

The building of a pneumatic tire by retaining the spaced bead rings of a tire carcass against movement while inflating the interior of a tire carcass and thence moving the respective beads at a controlled rate towards each other while maintaining a tension on the cords in the tire carcass to assure symmetry of shaping to the toroidal form.

4 Claims, 11 Drawing Figures

U.S. Patent   Dec. 2, 1975   Sheet 1 of 2   3,923,572
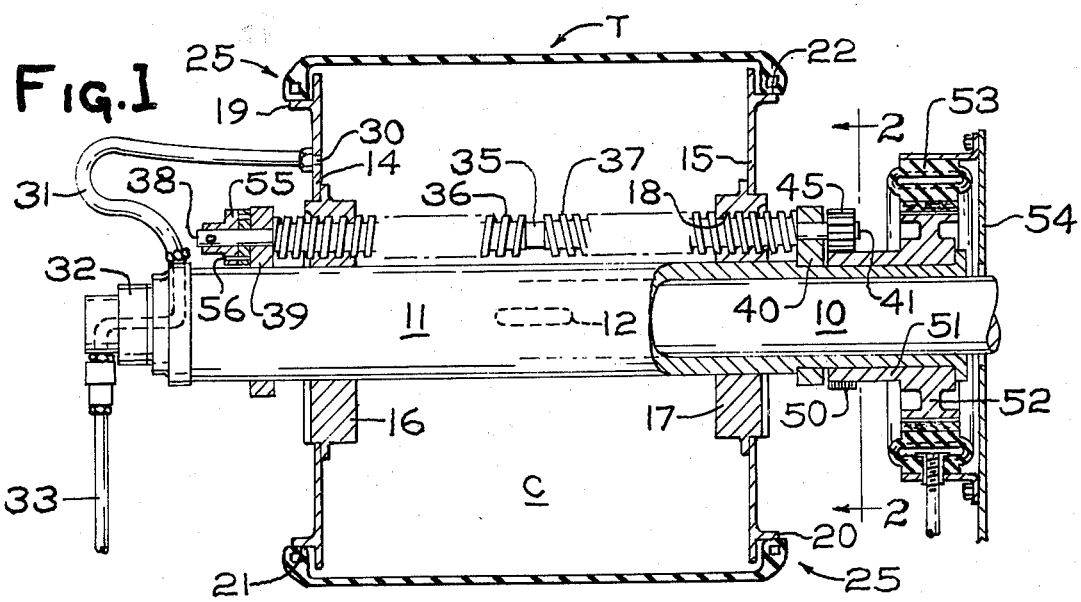
Fig.1
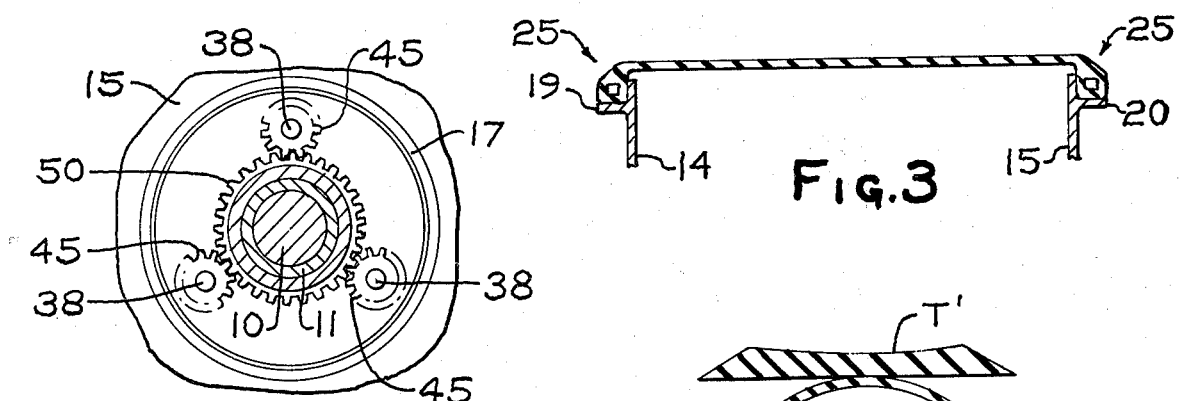
Fig.2
Fig.3
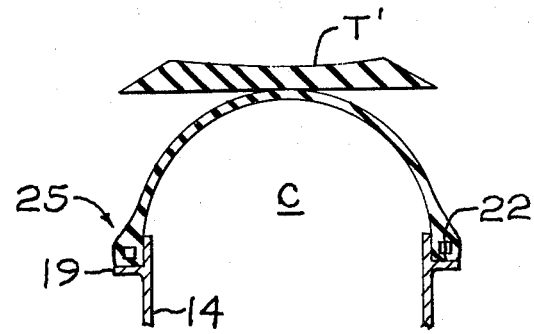
Fig.4
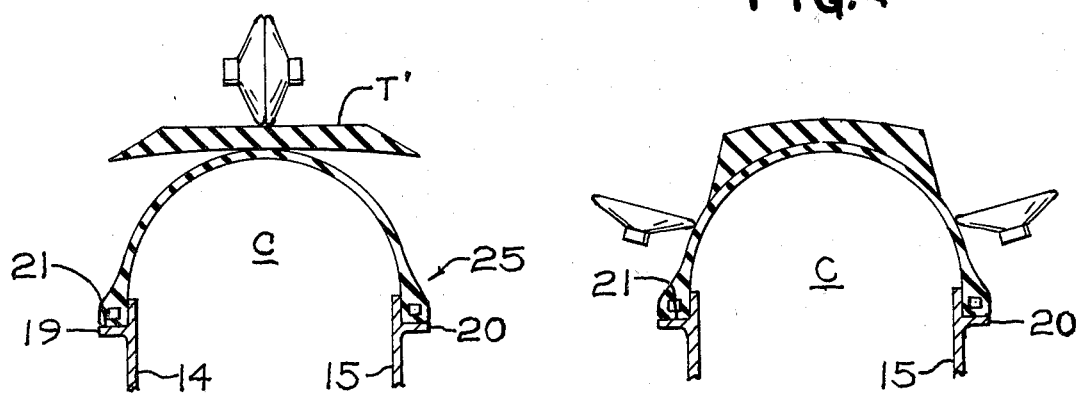
Fig.5
Fig.6

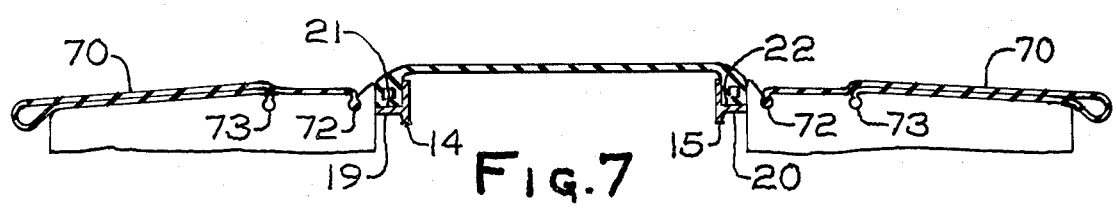
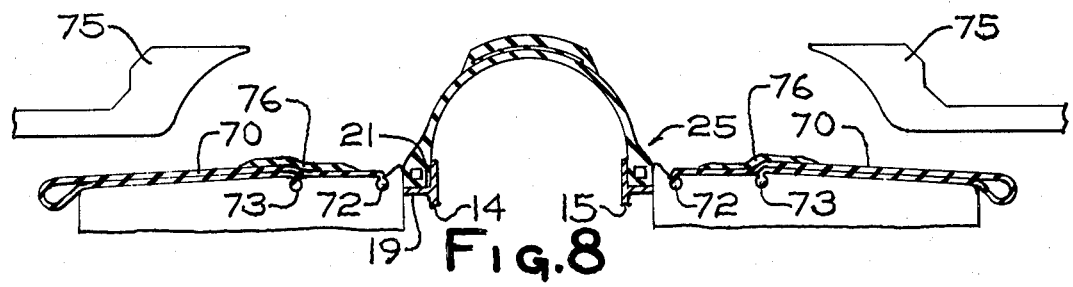
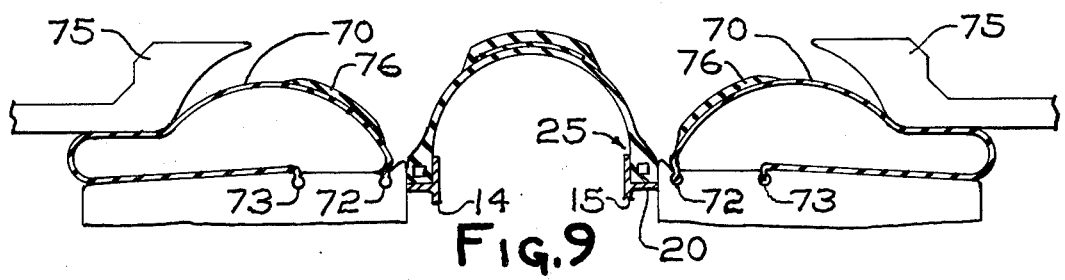
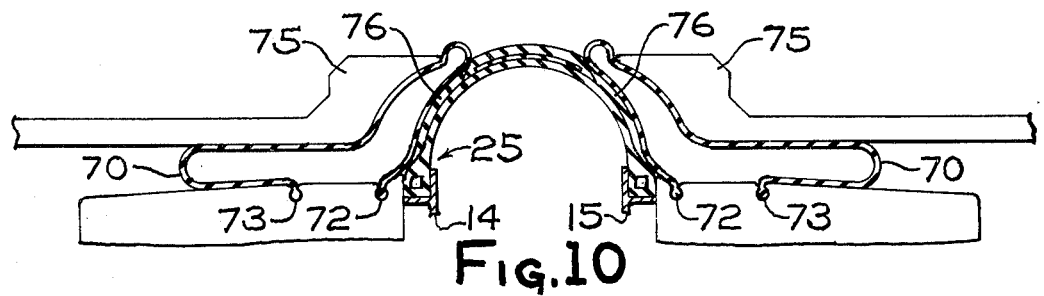
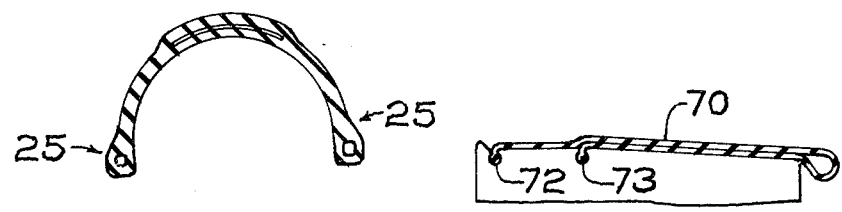

METHOD AND APPARATUS FOR BUILDING TIRES

This is a continuation of application Ser. No. 338,767 filed Mar. 7, 1973, now abandoned.

BACKGROUND OF THE INVENTION

This invention relates to a method and apparatus for building pneumatic tires and more particularly to the building of tires that require a shaping operation wherein an inextensible belt or band is applied to the tire carcass after it is shaped to a toroidal form. Green tires are built in the flat band method on a first machine and then shaped on a second machine where such inextensible belt is placed thereon prior to placement in a mold because the overhead is virtually inextensible. Prior apparatus for building tires of this type have included an inflatable rubber bladder bridging axially movable flanges and is employed by placing the carcass ply or plies of the tire on the bladder with the flanges separated and generally clamping the beads after which the flanges are brought toward each other and the bladder is inflated to shape the tire carcass so that the inextensible overhead band or belts and the sidewall can be applied to the carcass supported by the inflated bladder. Prior apparatus employed in the fabrication of such tires employing a second stage building drum have been expensive, cumbersome and fail to maintain full control over the shaping operation which affects the ultimate uniformity of the tire.

A further consideration that must be taken into account in such second stage building drums is that there is freedom of movement of the beads axially inwardly as the tire carcass begins to inflate. There is no restraint on the respective beads to hold a specific distance apart. The effect of this is that a tire carcass could inflate radially faster than it should so that the outer peripheral surface of the tire carcass contacted the tread off center. The cords in this situation would not all be tensioned the same since their tension is set once the radial diameter is restricted. The uneven movement is often initiated at the very moment of shaping only since there is no positive restriction on the bead shoulders.

SUMMARY OF THE INVENTION

The present invention contemplates an apparatus and method wherein the respective beads of a tire carcass are fully supported by spaced flanges having outwardly extending bead seats such that as the tire carcass is inflated and shaped, the respective beads are initially retained in their precise position and thence moved axially toward each other the same increment to accurately tension and control the cords and the corresponding uniformity of the tire and the distribution of the rubber thereon. In addition, the belt which is placed on the toroidally shaped tire may be placed circumferentially around the tire carcass after which such tire carcass is pressurized an additional amount which provides a curvature to the respective side edges of the overhead belt which facilitates the stitching and application of the sidewall. In some instances the sidewalls may be placed onto the tire carcass prior to the shaping operation.

BRIEF DESCRIPTION OF THE DRAWINGS

FIG. 1 is a section through the apparatus with the flange members in their separated position;

FIG. 2 is a partial section taken on 2—2 of FIG. 1 showing the drive gears;

FIGS. 3–6 show diagrammatically various steps in the tire building operation, with most the apparatus omitted;

FIGS. 7–11 show diagrammatically a modified process for building tire carcasses with most of the apparatus omitted for clarity sake.

DETAILED DESCRIPTION

Referring to the drawings, wherein like reference characters designate like or corresponding parts throughout the several views, there is shown in FIG. 1 a tire building or shaping drum mounted on the protruding shaft end 10 of a conventional tire building machine. The shaft 10 is mounted for controlled rotation on the usual frame (not shown) by means of a structure well-known in the art, such structure forming no part of the invention. The main support for the apparatus of the invention is an elongated sleeve 11 that is keyed to the shaft 10 by key 12. A pair of spaced annular discs 14 and 15 are suitably secured to annular collars 16 and 17, respectively, which collars are slidingly received by sleeve 11. The respective collars 16 and 17 have at least three pairs of axially aligned threaded bores 18 that are of opposite hand. The respective outer periphery of discs 14 and 15 are flanged as at 19 and 20 to form bead seats 21 and 22, which bead seats 21 and 22 receive the reinforced beads 25 of a tire carcass T. Such annular discs 14 and 15 together with the collars 16 and 17 form rim flanges or tire flanges for the receiving of the tire T. Such bead seats 21 and 22 as viewed in cross section (FIG. 1) form a right angle having their upwardly extending leg portions back to back such that the bead seats 21 and 22 provide an unobstructed clearance space that faces outwardly away from the center line of the tire T. The construction of the bead seats described may be referred to as outwardly extending bead seats as opposed to bead seats that would be formed on the inner portion of the discs 14 and 15 and so recessed as to face inwardly toward each other to provide unobstructed movement of the bead or shoulders of a tire toward the center line of a tire carcass. An inflation port 30 is formed in disc 14 for access to the interior of the air chamber formed by the tire carcass T, discs 14, 15, and the collars 16 and 17. Inflation port 30 is connected by a hose 31 to a rotary joint fitting 32 on the free end of sleeve 11, which receives compressed air or vacuum from supply line 33.

The discs 14 and 15, together with collars 16 and 17, are separated and brought toward each other by means of screws 35 which have threads 36 and 37 of opposite hand running in the threaded bores 18 in the respective collars 16 and 17. The outer ends 38 of the screws are rotatably supported by an end plate 39 fixed to sleeve 11 and a similar plate 40 fixed to the support sleeve 11 mounts the inner ends 41 of the screws 35. In order to drive the screws by rotation of the tire building drum shaft 10, the inner ends 41 of screws 35 have planet gears 45 keyed thereto. A sun gear 50 engages the planet gears 45 and is formed on a sleeve 51 that is rotatably mounted on the sleeve 11. Sleeve 51 is formed at its inner end with a brake hub 52 which is surrounded by an expander tube brake 53 mounted on frame support 54. The brake 53 is a known article of commerce, the structural details of which are not important to the invention. The outer end of one of the screws 35 carries a lock collar 55 slidable on and keyed to the end of the screw and from which projects a pin 56. Mating holes are drilled in the adjacent fixed end plate 39 so that when the lock collar 55 is shifted axially to the right and clamped into place by a set screw, the lead screws 35 cannot turn.

The operation of the gearing will now be explained. With lock collar 55 shifted to the left and with brake 53 applied to the brake hub 52, the latter is stationary. Now, rotation of the building drum shaft 10, sleeve 11 and discs 14, 15 carries the screws and the planet gears around the sun gear 50 which is fixed by the brake 53. This rotation will either separate or bring the respective flanges toward each other depending upon the direction of rotation given to the drum shaft 10. When the discs 14 and 15 have reached their desired position, the brake 53 is released and the lock collar 55 is applied to maintain that position.

When the brake 53 is released, sleeve 51 is free to rotate with the rest of the structure and locking collar 55 can be shifted to the right to lock the screws in place. Other means may be provided to move the respective discs 14 and 15 toward and away from each other as only a single means is shown.

In the operation described, a tire of a certain construction will be described and used as an example, it being understood, however, that the invention is not limited to a tire having all the details of this example.

The uncured green tire T under consideration is seen in FIG. 1 as having cylindrical plies, the cords are radially disposed or can be nearly radial, having inextensible bead 25. Suitable fill gum and a flipper strip may also be built therein or variations thereon. Sidewall rubber material is applied after which the carcass is inflated, an inextensible overhead and tread rubber of wear-resistant rubber being applied to the carcass. The apparatus is operated to separate the discs 14 and 15 until the desired distance between recesses 19 and 20 is obtained. A tire carcass T is then positioned over the disc 14 such that as viewed in FIG. 1, the right hand bead 25 is positioned onto recess 20 while the other bead 25 is positioned onto recess 19. Lead screw 35 is rotated sufficiently to maintain the respective beads 25 in tension while simultaneously therewith sufficient air pressure is introduced into the chamber C defined by the tire carcass T and the flanges 14 and 15 to distend the tire carcass into cylindrical form as depicted by FIG. 2. As the air pressure is increased, the lead screws 35 are rotated relative to shaft 10 such that the respective flanges 14 and 15 along with rings 21 and 22 are moved toward each other the precise same distance to control the toroidal shaping of tire carcass T to the form shown in FIG. 4. A slab of tread rubber T' is then placed on the tire carcass to circumferentially encompass such carcass with the respective ends stitched to each other as conventionally done. The pressure is then increased 1 to 3 psi above the existing pressure in chamber C which gives the slab of tread a concavity (as shown in FIG. 5) which facilitates the stitching (FIG. 4) of the tread to the tire carcass. If sidewalls have not been applied prior to the shaping operation then sidewalls are applied and stitched to the tire carcass.

A modified form of the invention is shown in FIGS. 7–11, inclusive. Herein the spaced annular discs 14 and 15 are similar in all respects to the above-described apparatus except that it has a pair of laterally spaced expansible annular tubular members 70—70 whose edges 72 and 73 are clamped between suitable rings and sleeves. Suitable means are provided to inflate such expansible tubular members 70 and 71 for a purpose to be described. Such members 70 and 71 are cooperative with a pair of laterally spaced annular shells 75—75 that are movable axially toward and away from each other by means old and well known in the art. See U.S. Pat. Nos. 3,433,695 and 3,409,490 as examples of known shells cooperative with inflatable members such as members 70—70. A pre-built tire carcass in cylindrical band form is placed onto the rim flanges or tire flanges wherein the respective beads of the tire carcass are received such that the flange recesses 19 and 20 have shoulders that are unobstructed axially outwardly as seen in FIG. 7. Such shoulders of flanges 14 and 15 have their beads forming annular rings or bead seats 21 and 22 so that the vertically extending portions of the recesses 19 and 20 prevent the tire carcass from shifting laterally or the bead portions thereof. As seen in FIG. 7, the respective discs 14 and 15 are spaced sufficiently away from each other so that with a slight pressurization of the chamber, defined by the tire carcass and the flanges, the tire carcass is maintained in a firm distended condition. Under these conditions, the respective beads 25—25 are evenly tensioned to maintain an even tension on the cords and its surrounding layers of ply stock to perfectly center the tread on the tire carcass and the corresponding distribution of rubber. As the tire was inflated for shaping to a toroidal form, the respective discs 14 and 15 would be moved toward each other to the position shown in FIG. 8. The respective discs 14–15 are restrained in their axial movement toward each other at a controlled rate to maintain an even tension in the cords and maintain firm engagement of the bead 25 with the bead rings or seats 21, 22. The tread is then placed onto the carcass and stitched thereto. The sidewalls 76—76 are then positioned onto the inflatable tubular members 70—70 and annular shells 75—75 are brought into position as shown in FIG. 8. Members 70—70 are inflated gradually with shells 75—75 being moved axially inwardly, which action presses the respective annular slabs of sidewall rubber onto the toroidal shaped tire carcass which is depicted by FIG. 10. The members 70—70 are then deflated and shells 75—75 retracted leaving the tire carcass in the form shown in FIG. 11, which carcass is removed from the tire building drum and is now ready for curing.

It will be apparent that, although a specific embodiment and certain modification of the invention have been described in detail, the invention is not limited to the specifically illustrated and described constructions since variations may be made without departing from the principles of the invention.

I claim:

1. A tire building apparatus comprising a support, said support having a pair of laterally spaced nonyieldable rim flanges mounted thereon for movement in an axial longitudinal direction toward and away from each other with said flanges operative to support a tire carcass therebetween, drive means connected to said rim flanges for rotating said rim flanges, each of said rim flanges being recessed to provide annular outwardly extending bead seats relative to the center of the drum for supporting the annular beads of a cylindrically shaped tire carcass, said annular outwardly extending bead seat being L-shaped in cross section with the respective vertically extending portion of said spaced flanges being back to back and the respective horizontally disposed portions extending outwardly away from said vertical portion, and away from each other. Transmission means on said support operatively connected to said flanges for rotating said flanges simultaneously and for selectively moving said flanges the same longitudinal distance toward each other or away from each other, and means for pressurizing a chamber defined by said flanges and a tire carcass held by said flanges.

2. A tire building apparatus comprising support means, said support means having a pair of spaced nonyieldable rim flanges mounted thereon for movement in an axial longitudinal direction toward and away from each other with said rim flanges operative to support a tire carcass therebetwwen, transmission means on said support operatively connected to said flanges for rotating said flanges about a common axis and for selectively moving said flanges the same longitudinal distance toward each other or away from each other, each of said flanges having an outer tire bead shoulder which has a vertical portion that is parallel to a plane that bisects said axis and wherein said plane is normal to said axis of rotation, said plane is equidistant from said spaced flanges, each of said tire bead shoulders having an annular cylindrical portion that extends horizontally away from said corresponding vertical portion and away from said plane, said tire bead shoulders operative to support one edge of an annular bead of a cylindrically shaped tire carcass, and means for pressurizing a chamber defined by said rim flanges and a tire carcass held by said flanges.

3. The method of manufacturing pneumatic tires comprising the steps of forming a cylindrical tire carcass with spaced bead on a tire drum, transferring said tire carcass to a second drum having spaced bead rim flanges, engaging the respective spaced bead flanges by axially moving the rim flanges axially away from each other, inflating the tire carcass to form a cylindrical shaped form while simultaneously maintaining tension on the respective laterally spaced beads to prevent inward movement thereof, shaping the tire carcass to a toroidal form by pressurizing the interior of the tire carcass while moving the spaced beads of the tire carcass axially toward each other under tension and with the cords in the tire carcass under tension, thence wrapping an inextensible belt and tread band on the mid-circumferential portion of the tire carcass, and said shaped tire with said tread band thereon is thence pressurizied above the existing pressure in said shaped carcass to give the inner peripheral surface of said tread a concavity to facilitate stitching, and stitching said tread to said tire carcass.

4. The method of manufacturing pneumatic tires as set forth in claim 3 wherein said shaped carcass is given said last mentioned pressurization of from 1–3 psi above the existing pressure in said carcass to give the tread stock on said tire carcass said concavity on the inner peripheral surface.

* * * * *